Patented Mar. 18, 1941

2,234,981

UNITED STATES PATENT OFFICE 2,234,981

FORMALDEHYDE SULPHOXYLATE DERIVATIVES OF DIPHENYL-SULPHIDES, -DISULPHIDES, -SULPHOXIDES, AND -SULPHONES, AND METHODS OF PRODUCTION

Sanford M. Rosenthal and Hugo Bauer, Washington, D. C., assignors to Government of the United States, as represented by the Secretary of the Treasury No Drawing. Application January 27, 1938, Serial No. 187,216

28 Claims. (Cl. 260—500)

(Granted under the act of March 3, 1883, as amended April 30, 1928; 370 O. G. 757)

The invention described herein may be manufactured and used by or for the Government of the United States for governmental purposes without payment of any royalty thereon.

The present invention comprises compounds of the general formula:

in which R is a radical selected from the group consisting of S, S—S, SO, and $SO_2$, and R' is a radical selected from the group consisting of $NH_2$, $NH.CH_2SO_2Na$, and $NO_2$; and in the method of their preparation. The invention is particularly concerned with compounds of 4-4'-diamino diphenylsulphoxide and 4-amino-4-nitro diphenyl sulphoxide as well as the corresponding sulphones, in which one or two amino groups are substituted by formaldehyde sulphoxylate, and also contemplates, in its broader aspects, the corresponding sulphides similarly substituted.

The new compounds described in the present invention are superior in certain respects to 4-4'-diamino diphenylsulphoxide, 4-4'-amino-nitro-diphenylsulphoxide and the corresponding sulphones, and may serve to replace them in medical applications. The products of the invention are much less toxic and show a greater index of therapeutic efficiency than the original sulphoxides or sulphones cited above. The products of this invention are intended to be administered by mouth or by injection.

(1) 4-4'-diamino diphenylsulphone was shown to possess curative action against bacterial infections due to organisms such as the streptococcus, pneumococcus, meningococcus and staphylococcus (see Buttle, Stephenson, Smith and Foster, Lancet, 1937, I, 1331).

(2) 4-amino-4'-nitro diphenylsulphone has been shown to possess chemotherapeutic action against bacterial infections by Fourneau, Trefouel, Nitti and Bovet (Bull. de l'Academie de Medicine, 1937, 118, 117), and also by Levaditi, Girard, Vaisman, Ray and Richard (Compt. Rend. de l'Academie de Medicine, 1937, 205, 1018).

(3) 4-4'-diamino diphenyl sulphoxide and (4) 4 amino 4'-nitro-phenyl sulphoxide were shown to possess curative action against bacterial infections by Girard, Ray and Richard (see Nature, 1937, 140, 283), and by Levaditi, Girard, Vaisman, Ray and Richard (Compt. Rend. Acad. de Sci., 1937, 205, 1018).

We have shown that the formaldehyde sulphoxylate derivatives of the compounds (1) (2) (3) and (4) render them water soluble so that they become suitable for injection purposes. The formaldehyde sulphoxylate derivatives also decrease the toxicity of these compounds and result in a higher index of therapeutic efficiency upon bacterial infections.

The general method of preparing these compounds is exemplified in the preparation of the 4,4'-diamino diphenylsulphone disodium formaldehyde sulphoxylate, as follows:

12 grams of the well known 4,4'-diamino diphenylsulphone (see Fromm and Wittmann, Berichte der Deutsch. Chem. Gesellsch. 1908, 41, p. 2264) and 15 grams of the sodium formaldehyde sulphoxylate are dissolved in 35 ccm. of glacial acetic acid. Upon the addition of ether the resulting condensation product is precipitated; the precipitate is washed with ether, then with alcohol. After filtering off, the precipitate is dissolved in water and neutralized with sodium bicarbonate. By addition of alcohol and ether the product is precipitated as a white powder which is dried in vacuum. It is readily soluble in water and stable for some days in a slightly alkaline solution.

Instead of working in glacial acetic solution, this compound may be prepared by addition of sodium formaldehyde sulphoxylate to the aqueous solution of the dihydrochloride of the 4,4'-diamino diphenylsulphone. The condensation product is isolated in the way described above.

By following the above method the disodium formaldehyde sulphoxylate derivatives of the other compounds mentioned may be prepared.

We claim as our invention:

1. As new chemical compounds, formaldehyde sulphoxylate derivatives of the general formula

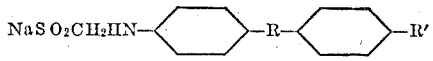

in which R is a radical selected from the group consisting of S, S—S, SO and $SO_2$, and R' is a radical selected from the group consisting of $NH_2$, $NH.CH_2 SO_2 Na$, and $NO_2$.

2. The method of preparing therapeutically active sulphoxylate derivative which consists in condensing with sodium formaldehyde sulphoxylate in glacial acetic acid a compound of the general formula

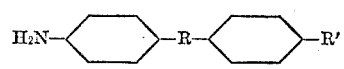

in which R is a radical from the group consisting of S, S—S, SO, and $SO_2$, and R' is a radical from the group consisting of $NH_2$, $NH.CH_2 SO_2 Na$, and $NO_2$, and recovering the resulting condensation product.

3. The method of preparing therapeutically active sulphoxylate derivatives which consists in adding sodium formaldehyde sulphoxylate to an aqueous solution of the dihydrochloride of a compound of the general formula

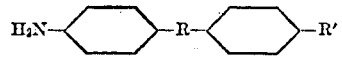

in which R is a radical from the group consisting of S, S—S, SO, and $SO_2$, and R' is a radical from the group consisting of $NH_2$, $NH.CH_2SO_2Na$, and $NO_2$, and recovering the resulting condensation product.

4. The disodium formaldehyde sulphoxylate derivative of 4,4'-diamino diphenylsulphone.

5. The method of preparing 4,4'-diamino diphenylsulphone disodium formaldehyde sulphoxylate which consists in condensing 4,4'-diamino diphenylsulphone with sodium formaldehyde sulphoxylate in glacial acetic acid, and recovering the resulting condensation product.

6. The method of preparing 4,4'-diamino diphenylsulphone disodium formaldehyde sulphoxylate by adding sodium formaldehyde sulphoxylate to an aqueous solution of the dihydrochloride of 4,4'-diamino diphenylsulphone, and recovering the resulting condensation product.

7. The sodium formaldehyde sulphoxylate derivative of 4-amino-4'-nitro-diphenylsulphone.

8. The method of preparing 4-amino-4'-nitro diphenylsulphone sodium formaldehyde sulphoxylate which consists in condensing 4-amino-4'-nitro diphenylsulphone with sodium formaldehyde sulphoxylate in glacial acetic acid, and recovering the resulting condensation product.

9. The method of preparing 4-amino-4'-nitro diphenylsulphone sodium formaldehyde sulphoxylate by adding sodium formaldehyde sulphoxylate to an aqueous solution of the dihydrochloride of 4-amino-4'-nitro diphenysulphone, and recovering the resulting condensation product.

10. The compound 4,4'-diamino diphenysulphoxide disodium formaldehyde sulphoxylate.

11. The method of preparing 4,4'-diamino diphenylsulphoxide disodium formaldehyde sulphoxylate which consists in condensing 4,4'-diamino diphenylsulphoxide with sodium formaldehyde sulphoxylate in glacial acetic acid, and recovering the resulting condensation product.

12. The method of preparing 4,4'-diamino diphenylsulphoxide disodium formaldehyde sulphoxylate by adding formaldehyde sulphoxylate to an aqueous solution of the dihydrochloride of 4,4'-diamino diphenylsulphoxide, and recovering the resulting condensation product.

13. The compound 4-amino-4'-nitro diphenyl-sulphoxide sodium formaldehyde sulphoxylate.

14. The method of preparing 4-amino-4'-nitro diphenylsulphoxide sodium formaldehyde sulphoxylate which consists in condensing 4-amino-4'-nitro diphenylsulphoxide with sodium formaldehyde sulphoxylate in glacial acetic acid, and recovering the resulting condensation product.

15. The method of preparing 4-amino-4'-nitro diphenylsulphoxide sodium formaldehyde sulphoxylate by adding formaldehyde sulphoxylate to an aqueous solution of the dihydrochloride of 4-amino-4'-nitro diphenylsulphoxide, and recovering the resulting condensation product.

16. The compound 4,4'-diamino diphenylsulphide sodium formaldehyde sulphoxylate.

17. The method of preparing 4,4'-diamino diphenylsulphide disodium formaldehyde sulphoxylate which consists in condensing 4,4'-diamino diphenylsulphide with sodium formaldehyde sulphoxylate in glacial acetic acid, and recovering the resulting condensation product.

18. The method of preparing 4,4'-diamino diphenylsulphide disodium formaldehyde sulphoxylate by adding formaldehyde sulphoxylate to an aqueous solution of the dihydrochloride of 4,4'-diamino diphenylsulphide, and recovering the resulting condensation product.

19. The compound 4-amino-4'-nitro diphenylsulphide sodium formaldehyde sulphoxylate.

20. The method of preparing 4-amino-4'-nitro diphenylsulphide sodium formaldehyde sulphoxylate which consists in condensing 4,4-amino 4'-nitro diphenylsulphide with sodium formaldehyde sulphoxylate in glacial acetic acid, and recovering the resulting condensation product.

21. The method of preparing 4-amino-4'-nitro diphenylsulphide sodium formaldehyde sulphoxylate by adding formaldehyde sulphoxylate to an aqueous solution of the dihydrochloride of 4-amino-4'-nitro diphenylsulphide, and recovering the resulting condensation product.

22. The compound 4,4'-diamino diphenyldisulphide sodium formaldehyde sulphoxylate.

23. The method of preparing 4,4'-diamino diphenyldisulphide disodium formaldehyde sulphoxylate which consists in condensing 4,4'-diamino diphenyldisulphide with sodium formaldehyde sulphoxylate in glacial acetic acid, and recovering the resulting condensation product.

24. The method of preparing 4,4'-diamino diphenyldisulphide disodium formaldehyde sulphoxylate by adding formaldehyde sulphoxylate to an aqueous solution of the dihydrochloride of 4,4'-diamino diphenyldisulphide, and recovering the resulting condensation product.

25. The compound 4-amino-4'-nitro diphenyldisulphide sodium formaldehyde sulphoxylate.

26. The method of preparing 4-amino-4'-nitro diphenyldisulphide sodium formaldehyde sulphoxylate which consists in condensing 4-amino-4'-nitro diphenyldisulphide with sodium formaldehyde sulphoxylate in glacial acetic acid, and recovering the resulting condensation product.

27. The method of preparing 4-amino-4'-nitro diphenyldisulphide sodium formaldehyde sulphoxylate by adding formaldehyde sulphoxylate to an aqueous solution of the dihydrochloride of 4-amino-4'-nitro diphenyldisulphide, and recovering the resulting condensation product.

28. Compositions consisting of combination products of alkali metal formaldehyde sulphoxylate and one of the group consisting of diamino diphenyl sulphide and diamino diphenyl sulphone.

SANFORD M. ROSENTHAL.
HUGO BAUER.

CERTIFICATE OF CORRECTION.

Patent No. 2,234,981. March 18, 1941.

SANFORD M. ROSENTHAL, ET AL.

It is hereby certified that error appears in the printed specification of the above numbered patent requiring correction as follows: Page 2, second column, line 23, claim 20, for "4,4-amino" read --4-amino--; and that the said Letters Patent should be read with this correction therein that the same may conform to the record of the case in the Patent Office.

Signed and sealed this 30th day of September, A. D. 1941.

(Seal)

Henry Van Arsdale,
Acting Commissioner of Patents.